July 15, 1969  M. C. BARRETT ET AL  3,455,466
GRAVITY DROP ACCUMULATOR FOR AUTOMATIC BALE WAGON
Filed April 17, 1967  5 Sheets-Sheet 3

INVENTORS
MONROE C. BARRETT
FENTON L. KENNA, JR.
LOUIS E. NICKLA
WILBUR H. CLENDENIN

Noel G. Artman
ATTY

July 15, 1969  M. C. BARRETT ET AL  3,455,466
GRAVITY DROP ACCUMULATOR FOR AUTOMATIC BALE WAGON
Filed April 17, 1967  5 Sheets-Sheet 4
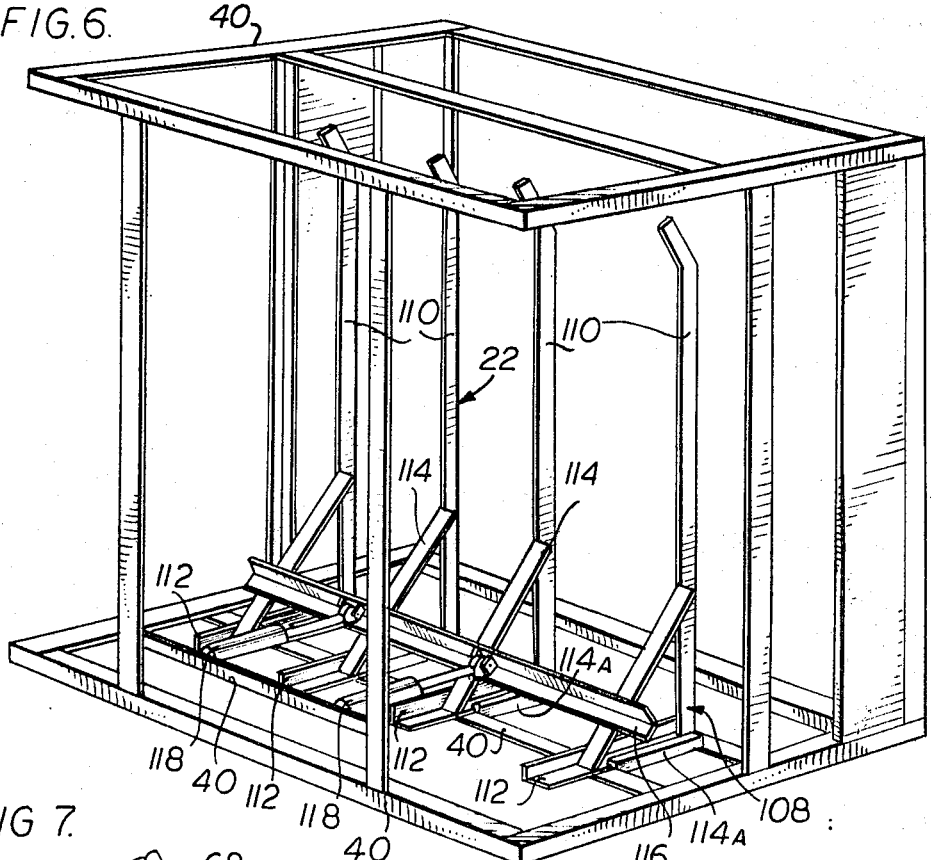
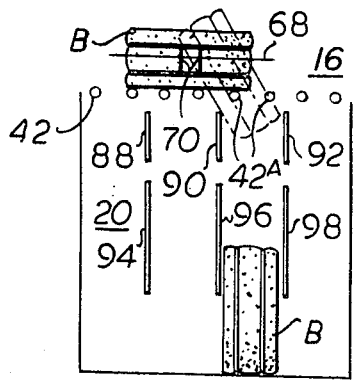
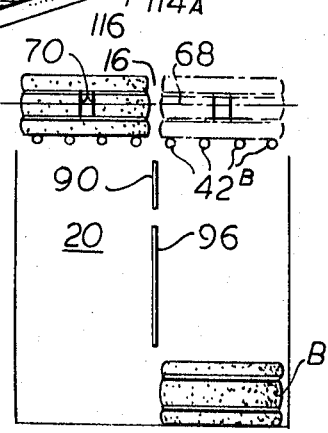
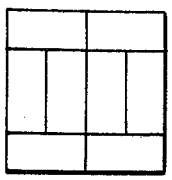
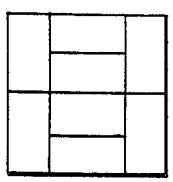
INVENTORS
MONROE C. BARRETT
FENTON L. KENNA, JR.
LOUIS E. NICKLA
WILBUR H. CLENDENIN
ATTY

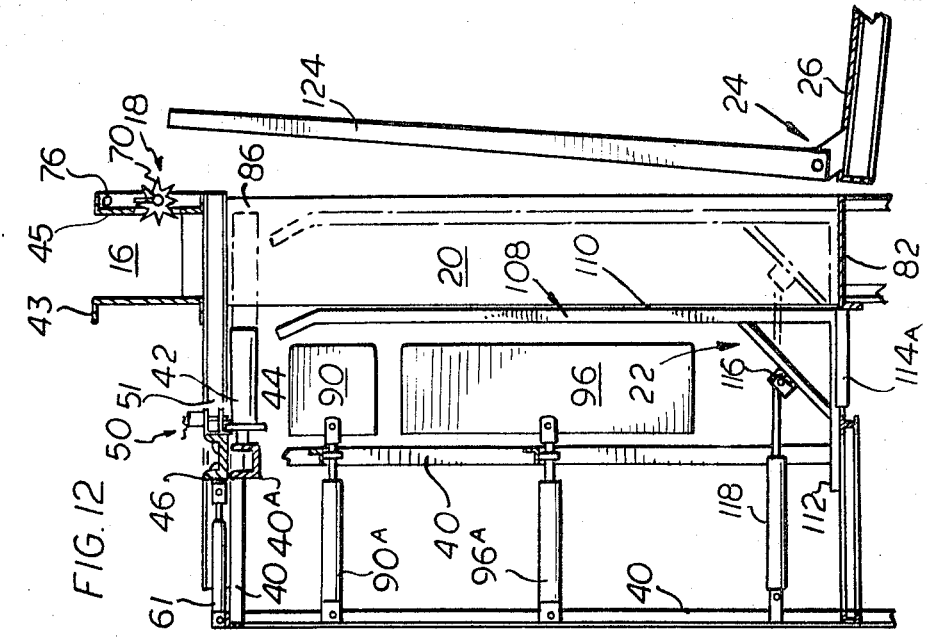
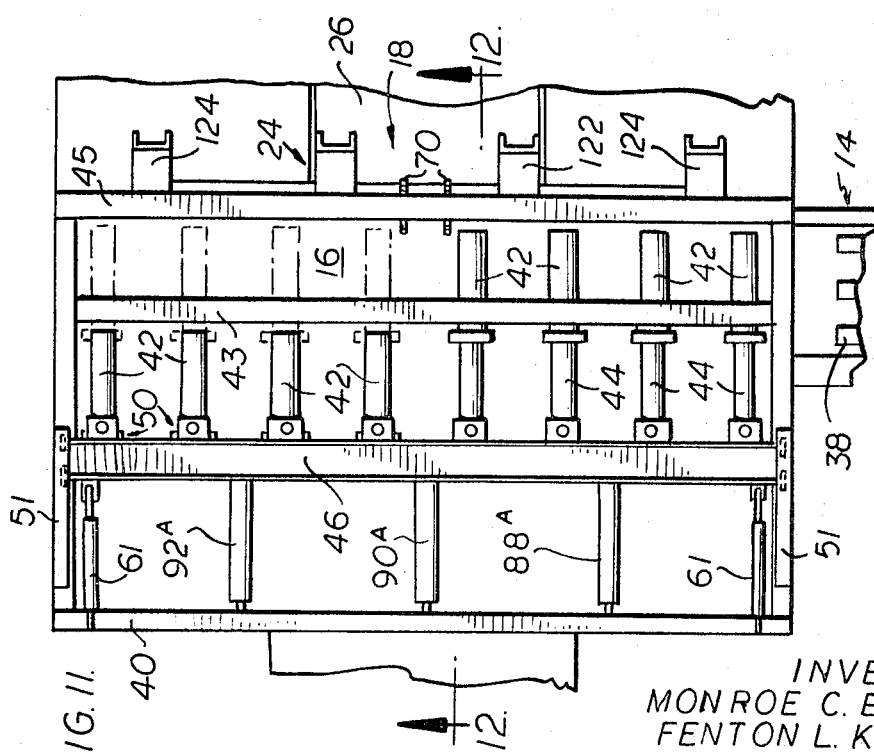

United States Patent Office 3,455,466
Patented July 15, 1969

3,455,466
GRAVITY DROP ACCUMULATOR FOR AUTOMATIC BALE WAGON
Monroe C. Barrett, Fenton L. Kenna, Jr., Louis E. Nickla, and Wilbur H. Clendenin, Memphis, Tenn., assignors to International Harvester Company, Chicago, Ill., a corporation of Delaware
Filed Apr. 17, 1967, Ser. No. 631,354
Int. Cl. B65g 57/22
U.S. Cl. 214—6                                       5 Claims

ABSTRACT OF THE DISCLOSURE

A bale wagon for automatically picking up, accumulating, and storing bales of hay. A bale-receiving platform comprising a plurality of axially movable rollers is positioned over a bale accumulating chamber. The removal of the rollers permits the passage of bales through the platform into the underlying bale chamber. The rollers are selectively removed so that bales are deposited at various locations and orientations in the chamber. The sequence of operation is particularly selected so that eight bales are accumulated in the bale chamber in a predetermined pattern.

BACKGROUND AND SUMMARY OF THE INVENTION

The present invention relates generally to automatic bale wagons and more specifically to an improved stacking mechanism.

During recent years there has been considerable activity in the bale handling art. The early bale wagons, such as those described in U.S. Patents 2,702,131 and 2,848,127, issued to D. M. Leupke and G. E. Grey, respectively, operated on the principle of accumulating a series of stacks of bales formed by their respective stacking means. Since each stack was formed in the same manner as were the preceding or succeeding stacks, the bales were accumulated in a pattern wherein the longitudinal axes of all the bales were parallel, resulting in an unstable stack. In order to haul bales of hay the bales must be stacked in a pattern known as cross-tieing. Cross-tieing describes the pattern wherein the individual bales are interlocked with vertically adjacent bales. Completely interlocked bales are sufficiently stable to permit loading and hauling of the complete stack intact. Bales accumulated in a non-interlocked pattern must be restacked to place them in a condition for handling. The additional stacking is time consuming and has seriously limited the utility of the automatic bale stacking wagon.

The general purpose of the present invention is to provide a stacking chamber that stacks bales in a complete interlocked pattern. The interlocking is accomplished by selectively depositing bales in a bale accumulating chamber in a desired orientation. The structure comprises generally a vertical chamber and a bale-receiving platform positioned directly over the stacking chamber. The platform is selectively removable in parts so that bales gravitate into the chamber in the desired orientation. By selectively removing parts of the receiving platform, each bale can be deposited in any one of several positions in the chamber and by selecting the proper sequence of operation complete interlocking can be obtained.

An object of the present invention is to provide a stacking mechanism that stacks bales in an interlocked pattern.

Another object is to provide a bale wagon stacking chamber that forms stacks of bales in an alternate interlocked pattern.

A further object is to provide a mechanism that accumulates bales in a vertical chamber in a predetermined pattern.

BRIEF DESCRIPTION OF THE DRAWINGS

FIGURE 5 is a side view of the roller carriage shown in FIGURE 4;

FIGURE 6 is another simplified perspective view of the stacking chamber illustrating additional features;

FIGURE 7 is a schematic illustrating the manner in which a bale is deposited in the chamber in one disposition;

FIGURE 8 is another schematic illustrating the manner in which a bale is deposited in the chamber in another disposition;

FIGURES 9 and 10 are diagrammatic illustrations of two stacking patterns attainable by use of the present invention;

FIGURE 11 is a plan view of the bale stacking chamber illustrating the roller carriage assembly; and FIGURE 12 is a sectional view of the bale stacking chamber and taken generally along line 12—12 of FIGURE 11.

DESCRIPTION OF THE PREFERRED EMBODIMENT

General

Figure 1:
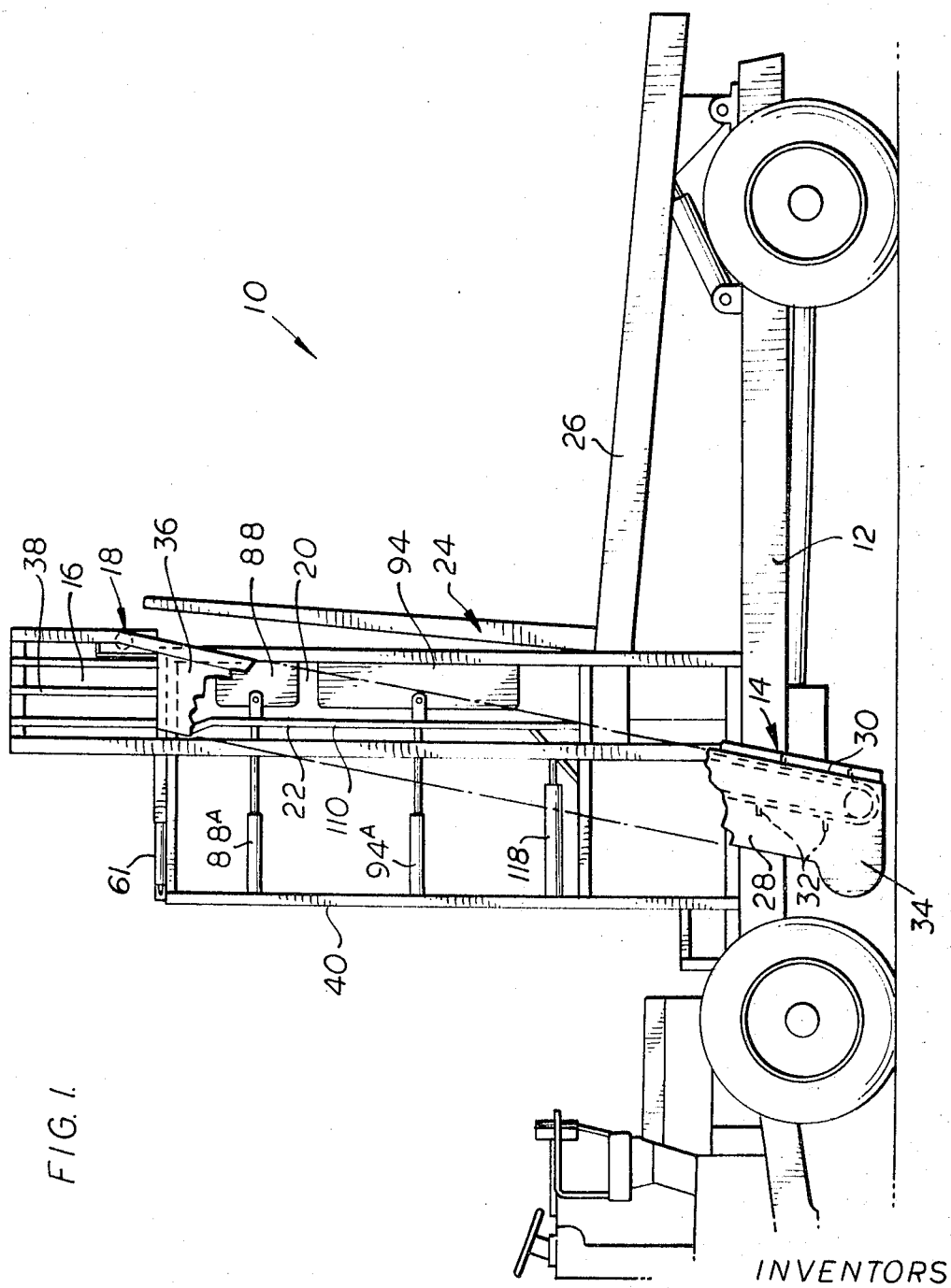
FIGURE 1 is an elevational view of the bale wagon, with portions cut away for convenience of illustration.
Figure 2:
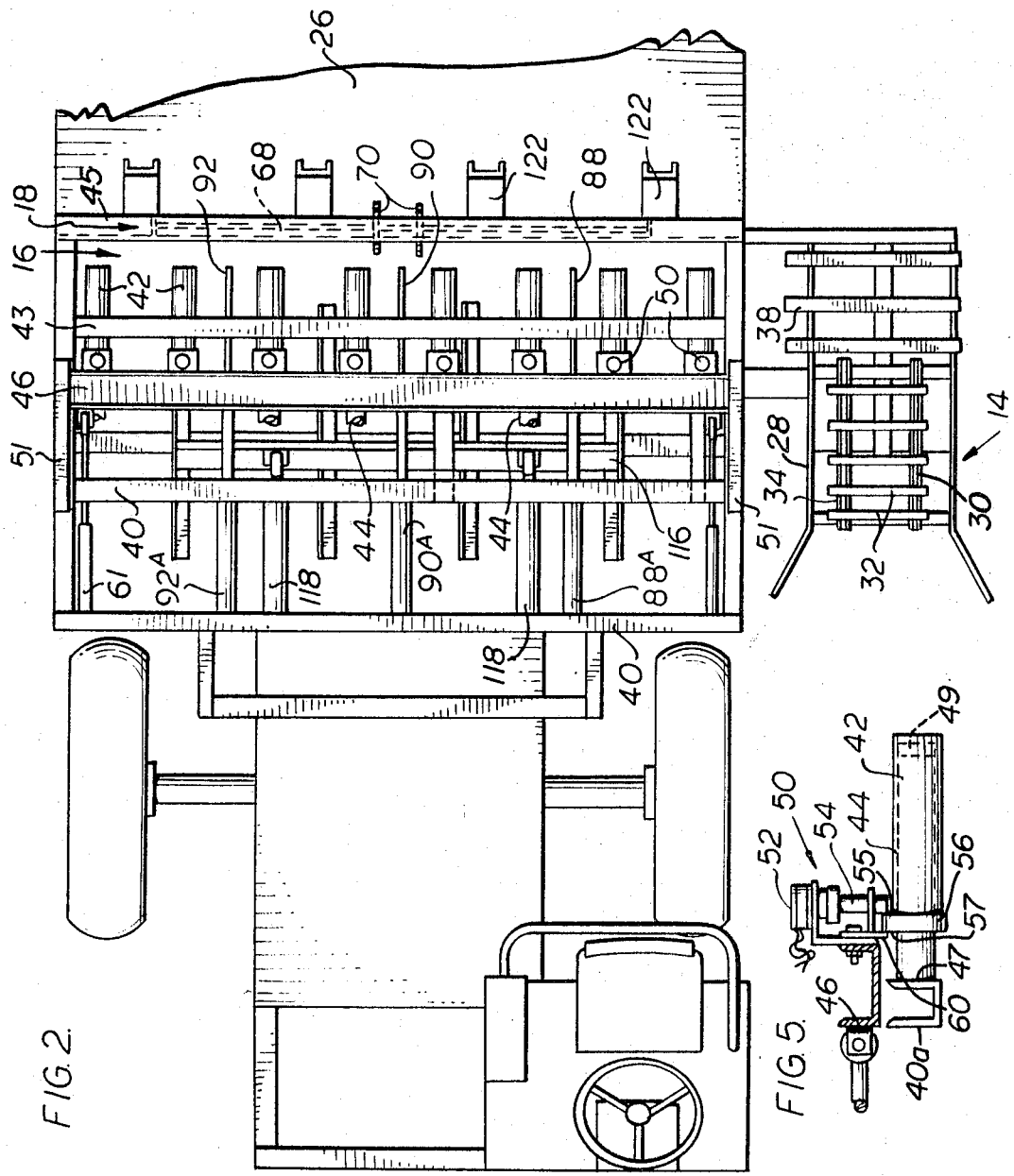
FIGURE 2 is a plan view of the wagon shown in FIGURE 1.

With reference to FIGURES 1 and 2, a bale wagon 10 constructed in accordance with the principles of the present invention comprises generally a wheel mounted chassis 12, an elevator 14, a bale chute 16 positioned to receive bales from the elevator 14, a transfer mechanism 18 extending adjacent the bale chute 16, a bale chamber 20 located directly below the bale chute 16, a forward movable wall 22 (see FIGURE 6) closing the forward side of bale chamber 20, a carriage 24 closing the rearward facing side of the bale chamber 20, and a storage bed 26.

Elevator 14

The elevator 14 is positioned at one side of the bale chamber 20 and consists of a guide frame 28 which carries an endless link chain 30. The link chain 30 has a plurality of bale-engaging flights 32 spaced therealong. The lower end 34 of the elevator 14 is open for receiving bales laying on the ground, and an upper end 36 is aligned with chute 16 for depositing elevated bales thereon. A deflector member 38 serves to guide the bales from the elevator 14 onto the platform 16.

The components—bale chute 16, transfer means 18, bale chamber 20, and the movable wall 22—are supported by a substructure, denoted generally as 40, which extends up from the chassis 12.

Bale chute 16

As best seen in FIGURES 11 and 12 the bale chute 16 is defined laterally by a pair of spaced, and transverse walls 43 and 45 supported by substructure 40. A plurality of parallel and equally spaced rollers 42 bottoms the chute 16 and serves as the receiving platform for bales delivered by the elevator 14. With reference to FIGURE 5, each of the rollers 42 is mounted on a shaft 44 which is supported at its forward end 47 by a cross member 40a of the substructure 40. The rearward end 49 of shaft 44 terminates at point longitudinally removed from the confines of chute 16 (see FIGURE 11).

Each roller 42 is free-wheeling about its corresponding shaft 44 and is axially movable with respect thereto. In the axially extended position of the roller 42 on shaft 44, each roller 42 protrudes into the chute 16 (see FIGURES 11 and 12) and, with similarly situated rollers, provides a bale receiving platform. In the retracted position of the roller 42 on its shaft 44, the roller 42 is removed from the chute 16. The removal of a roller 42 or combinations thereof, opens a passageway to the underlying stacking chamber 20.

Axial movement of the rollers 42 is effected by means of a roller carriage 46 best seen in FIGURES 11 and 12. The carriage 46 includes a transverse channel member rollably mounted in lateral tracks 51, 51. The tracks 51, 51 are attached to substructure 40 and extend longitudinally with respect to chassis 12 and are placed so that the carriage 46 moves fore and aft in a horizontal plane slightly above the row of rollers 42 and their corresponding shaft 44.

Figure 4:
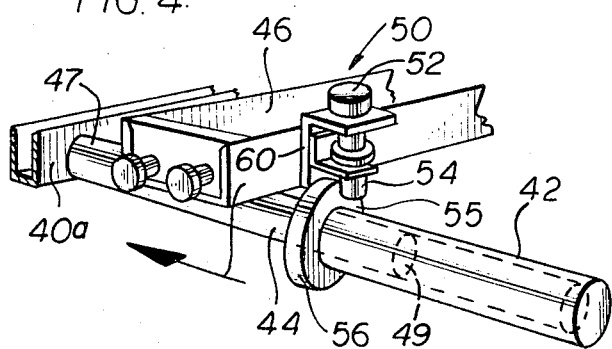
FIGURE 4 is a fragmentary view of the roller carriage used in the bale wagon.

A plurality of latch assemblies 50, one for each roller 42, is carried by the carriage 46 and provides the means for engaging and disengaging the carriage 46 with and from the rollers 42. With reference to FIGURES 4 and 5 each latch assembly 50 includes a solenoid 52 and a pin 54 descending from the armature of the solenoid 52. With a deenergized solenoid 52, the pin 54 confronts a rearwardly facing shoulder 55 of a flange 56 formed in the roller 42. Engagement of the pin 54 upon shoulder 55 provides the contact point for removing the roller 42 from the chute 16 as the carriage 46 moves in a forward direction. With an energized solenoid 52 the pin 54 clears the shoulder 55 as the carriage 46 moves rearwardly leaving roller 42 disposed in the chute 16 (see FIGURES 11 and 12). Thus it will be appreciated that by selectively energizing the solenoids 52, any roller 42 or any combination thereof can be removed from the chute. As is discussed in detail below, selective removal of the rollers determines the disposition of a bale deposited in the chamber.

A downwardly extending strap 60 from the latch assembly 50 confronts a forwardly facing shoulder 57 of flange 56. Movement of the carriage 46 in a rearward direction causes the strap 60 to engage and force roller 42 into chute 16.

As shown in FIGURES 11 and 12, the carriage 46 is moved fore and aft within the limits of tracks 51, 51 by means of a pair of hydraulic rams 61, 61. The rams 61, 61 are conventional, having a cylinder connected to the substructure 40 and a piston rod connected to the carriage 46.

Transfer mechanism 18

As indicated the bale chute 16 and the stacking chamber 20 are separated by a row of rollers 42. The rollers 42 are particularly spaced along the chute 16 so that a bale in chute 16 overlies four rollers. In order to deposit the bale in the chamber 20 according to the stacking scheme the position of the bale must be coordinated with the selective removal of rollers 42 from the chute 16. The transfer mechanism 18 provides the means moving a bale delivered to the chute 16 to the proper position therein. The transfer mechanism includes a star wheel assembly 66 slidably mounted on a horizontal shaft 68 mounted on the rearward side chute wall 45 (see FIGURE 3). The assembly 66 has a pair of axially spaced star wheels 70, 70 which have peripheral portions protruding into chute 16 through a slot 72 formed in wall 45 as shown in FIGURES 11 and 12. The slot 72 extends longitudinally along wall 45 and defines the limits of the movement of the assembly 66 along shaft 68.

The assembly 66 is moved by means of a conventional cable cylinder 76 attached to wall 45 and disposed above slot 72. A cable 74 is trained over a pair of pulleys 78, 78 mounted at opposite ends of cylinder 76. The cable 74 has a top run 74a connected to a piston 76a slidably mounted in cylinder 76, and a bottom run 74b connected to assembly 66 by connector 80. Thus it will be seen that as piston 76a moves within the confines of cylinder 76, the star wheel assembly 66 will be moved within the limits of the slot 72.

The star wheels 70, 70 are free-wheeling on assembly 66 so that the peripheries rollingly penetrate a bale deposited in the chute, and rollingly disengage as the bale is dropped into the underlying chamber 20.

Bale chamber 20

Figure 3:
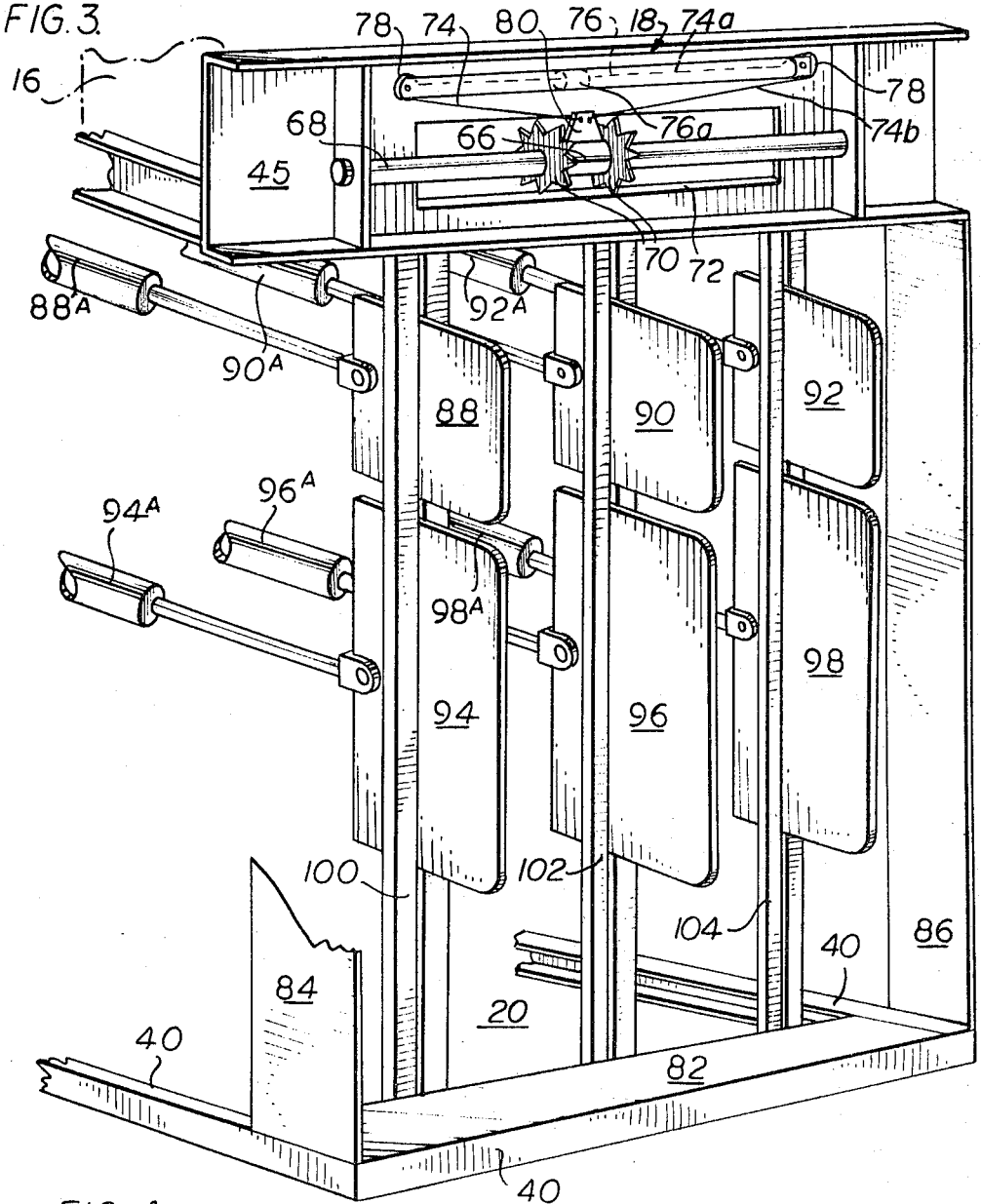
FIGURE 3 is a simplified perspective view of the stacking chamber illustrating particular features used therein.

The bale accumulating chamber 20 shown in FIGURES 3 and 12 comprises a floor plate 82 secured to the substructure 40 and laterally spaced, upright side walls 84 and 86. The side walls 84 and 86 extend upwardly from the ends of floor 82 to an elevation slightly below the bale chute 16, the space between the side walls 84 and 86 constituting the stacking zone. The floor 82 substantially underlies the horizontal extent of the bale chute 16 so that bales in any position in chute 16 will be located directly above floor 82.

In order to maintain the bales in the desired position in the chamber 20 six partitions 88, 90, 92, 94, 96 and 98 are provided (see FIGURE 3). The partitions are adapted to move into and out of the chamber 20 according to the stacking scheme and are operatively coordinated with the transfer mechanism 18 and the roller removal means. Partitions 88, 90 and 92 are square plate members sized to approximate the dimensions of a bale, a bale section taken along the minor axis and partitions 94, 96 and 98 are rectangular plate members sized to approximate the dimensions of a bale section taken along its major axis.

The partitions 88, 90, 92 are movably mounted in upright slotted members 100, 102 and 104 which are spaced along the front side of the chamber 20. Each of the slotted members 100, 102 and 104 sustain a pair of partitions in vertical alignment, the pair comprising a square partition (88, 90, 92) and a rectangular partition (94, 96, 98). The square partitions 88, 90 and 92 are placed near the top of chamber 20 and have their edges in horizontal alignment. The rectangular partitions 94, 96 and 98 placed in vertical alignment under its companion square partition, have their edges in horizontal alignment. The lower edges of the rectangular partitions are located approximately one bale thickness above floor 82.

The partitions 88, 90, 92, 94, 96 and 98 are independently movable in a vertical plane into and out of the chamber 20. The partitions each are moved by a hydraulic ram specifically enumerated as 88a, 90a, 92a, 94a, 96a and 97a to denote the paired relationship. Each ram, as for example 88a in FIGURE 2, has a cylinder portion secured to the forward edge of partition 88. Thus, selective actuation of the rams 88a, 90a, 92a, 94a, 96a and 98a partitions the chamber 20 according to the stacking pattern desired.

Forward wall 22

As best seen in FIGURE 6 the movable forward wall 22 which defines the forward extent of the chamber 20 comprises a plurality of L-shaped members 108, each member having an upright extension 110 and a horizontal extension 112. The laterally aligned upward extensions 110 constitute the forward wall. The horizontal extension 112 is slidably mounted in guide members 114a supported by substructure 40. The extensions 110 and 112 are interconnected by brace 114. The individual L-shaped members 108 are maintained in parallel assembled relation by a horizontal angle 116 welded to the brace 114 of each member 108. The movable wall is driven by a pair of hydraulic rams 118, each of which has a cylinder end connected to the substructure 40 and a piston rod connected to the horizontal angle member 116. Therefore, as the hydraulic rams 118 are actuated the L-shaped members 108 move as a unit into the bale chamber 20 forcing the stack of bales therefrom (broken line position in FIGURE 12).

Stack receiving bed 26

In order to maintain the bales in stacked relation as they are moved from the accumulating chamber 20 to the storage bed 26, the carriage structure 24 supportingly receives the stack and moves rearwardly along bed 26. The carriage structure 24 comprises a plurality of laterally spaced upright tines 122. The means for mounting the carriage 24 so as to be movable along storage bed 26 may be according to the structure described in Patent No. 2,848,127.

OPERATION

The sequential operation of the transfer means 18, means for removing rollers 42, and the partitions (88–98) may be best described with reference to the schematic drawings presented in FIGURES 7 and 8. As a bale B is deposited in chute 16 the star wheels 70 penetrate the rearward facing side of the bale B and moves it along rollers 42. If it is desired to deposit the bale B upended in stacking chamber 20, partitions 88–98 are first moved into the stacking chamber 20 and a pair of rollers denoted 42a are moved out of chute 16 when the bale has reached a predetermined position on the rollers. Thus as the bale is moved across chute 16 it drops endwise into the bale chamber 20 through the passage opened by the rollers 42a which are removed after the bale reaches a predetermined position. The bale drops to the bottom of chamber 20 and is maintained in the upended orientation by partitions 96 and 98. Now, if it is desired to deposit the bale B horizontally in bale chamber 20 the bale B is moved to the position shown in FIGURE 8 at which time it rests on four rollers denoted 42b and all the partitions except partitions 90 and 96 are removed from the bale chamber 20. With the bale in the dotted line position of FIGURE 8, rollers 42b are removed from the chute 16 allowing the bale to drop into the stacking chamber 20 in a horizontal orientation. Thus it will be appreciated that by selectively removing rollers and selectively partitioning the stacking chamber 20, any stacking pattern may be attained. Alternate stacks according to the pattern shown in FIGURES 9 and 10 provides for complete interlocking of the bales.

The entire sequence of operation will be described with reference to FIGURES 1, 3, 11 and 12.

As the bale wagon 10 approaches a bale resting on the ground, elevator opening 34 is aligned with the longitudinal axis of the bale so that one end of the bale enters opening 34. The endless link chain 30 grips the bale by flights 32, elevating it through the frame 28. At the upper end of the elevator 14, the bale strikes deflector 38 and is deposited in bale chute 16. As the bale flops over onto the row of rollers 42 star wheels 70 penetratingly engage the rearwardly facing side of the bale. Actuation of hydraulic cylinder 76 moves the bale to the desired position in chute 16, and hydraulic rams (88a–98a) selectively move the partitions (88–98) into position.

Next the rollers 42 are selectively removed from chute 16 by moving the roller carriage 46 forwardly through actuation of rams 61. The latched rollers 42 are moved axially on shaft 44 and the unlatched rollers 42 remain in the bale chute 16 (see FIGURE 11).

The coordinated operation of the roller carriage 46, latching assembly 50, the transfer mechanism 18, and partitions 88–98, deposits the bale in the bale accumulating chamber 20 in the desired orientation in the manner discussed above. Successive bales are deposited in the chamber 20 in a manner consistent with the stacking pattern desired.

After eight bales have been acculated in the bale chamber 20, the movable wall 22, hydraulically driven by rams 118, moves rearwardly forcing the stack therefrom onto the receiving bed 26. Bales received on the bed 26 are maintained in the stacked condition by the carriage 24. As successive stacks are formed in the manner described and deposited on the bed 26 the carriage 24 moves rearwardly until a complete load is stored on bed 26. The wagon is then driven to a central storage area where the bed 26 is upended and the stack is deposited on the ground. In upending the stacks of bales the vertical layers as carried on the bed 26 now become horizontal layers on the ground, the bales being interlocked with respect to vertically adjacent bales.

It should be understood that the foregoing disclosure relates to only a preferred embodiment of the invention and that numerous modifications may be made therein without departing from the spirit and scope of the invention.

What is claimed is:

1. A bale wagon for mechanically accumulating bales of hay, said bale wagon comprising:
   a chassis;
   a bale accumulating chamber supported by said chassis and extending transversely thereacross, said chamber having a length such to accommodate at least a two-bale row and a height such to accommodate a plurality of said rows;
   a bale chute overlying said chamber, said chute including a plurality of bale supporting members and means for selectively moving said members from said chute to form bale passageways at predetermined locations along said chute whereby bales accommodated in said chute may gravitate into said chamber at different locations along said chute;
   means associated with said chamber for accumulating a plurality of bales delivered thereto into a vertical transversely extending stack;
   a bale elevator for delivering bales into said chute;
   a storage bed mounted on said chassis and disposed rearwardly of said chamber; and
   means for moving a stack accumulated in said chamber onto said storage bed.

2. The invention as recited in claim 1 wherein said bale supporting members include a plurality of parallel rollers extending transversely into said chute, and said means for moving said members include a carriage having latching means selectively engageable with and disengageable from said rollers, said carriage being movable in a fore and aft direction whereby movement in one direction with said latching means engageable with said rollers moves said rollers axially out of said chute and movement in the opposite direction moves said rollers axially into said chute, said latching means being selectively actuable so that selected rollers may be removed to open a passageway at a predetermined location along said chute.

3. The invention as recited in claim 2 wherein said rollers are particularly spaced so that removal of a pair of adjacent rollers forms a passageway such to accommodate a bale endwise therethrough whereby bales are delivered to said chamber with its major axis disposed vertically, and removal of four adjacent rollers forms a passageway such to accommodate a bale crosswise therethrough whereby bales are delivered to said chamber with its major axis disposed horizontally.

4. The invention as recited in claim 3 wherein said means associated with said chamber includes partitions for maintaining said bales in the attitude as delivered into said chamber, said partitions being selectively movable into and out of said chamber whereby said partitions may be correlated with said carriage in accordance with the stack pattern desired.

5. The invention as recited in claim 4 wherein said means for moving said stack accumulated in said chamber includes a vertical wall closing one side of said chamber and means for moving said wall transversely through said chamber whereby bales disposed in said chamber are forced therefrom onto said storage bed.

(References on following page)

References Cited

UNITED STATES PATENTS

| | | | |
|---|---|---|---|
| 2,702,131 | 2/1955 | Leupke | 214—6 |
| 2,733,921 | 2/1956 | Downs. | |
| 2,984,838 | 5/1961 | Parker | 214—6 X |
| 3,158,270 | 11/1964 | Prentice | 214—6 |
| Re. 25,750 | 3/1965 | Adams et al. | 214—6 X |
| 3,251,485 | 5/1966 | Fancher | 214—6 |
| 3,270,630 | 9/1966 | Frappier et al. | 214—6 X |
| 3,330,426 | 7/1967 | Bishop | 214—6 |

GERALD M. FORLENZA, Primary Examiner

ROBERT J. SPAR, Assistant Examiner